(12) United States Patent
Zoldi et al.

(10) Patent No.: US 11,049,012 B2
(45) Date of Patent: Jun. 29, 2021

(54) EXPLAINING MACHINE LEARNING MODELS BY TRACKED BEHAVIORAL LATENT FEATURES

(71) Applicant: FAIR ISAAC CORPORATION, Roseville, MN (US)

(72) Inventors: Scott Michael Zoldi, San Diego, CA (US); Chahm An, Poway, CA (US)

(73) Assignee: Fair Isaac Corporation, Roseville, MN (US)

( * ) Notice: Subject to any disclaimer, the term of this patent is extended or adjusted under 35 U.S.C. 154(b) by 880 days.

(21) Appl. No.: 15/820,141

(22) Filed: Nov. 21, 2017

(65) Prior Publication Data

US 2019/0156196 A1    May 23, 2019

(51) Int. Cl.
| | |
|---|---|
| *G06N 3/08* | (2006.01) |
| *G06N 3/04* | (2006.01) |
| *G06F 16/35* | (2019.01) |
| *G06F 16/36* | (2019.01) |
| *G06N 7/00* | (2006.01) |
| *G06Q 20/40* | (2012.01) |
| *G06N 20/00* | (2019.01) |

(52) U.S. Cl.
CPC ............... *G06N 3/08* (2013.01); *G06F 16/35* (2019.01); *G06F 16/367* (2019.01); *G06N 3/0427* (2013.01); *G06N 7/005* (2013.01); *G06N 20/00* (2019.01); *G06Q 20/40* (2013.01); *G06Q 20/4016* (2013.01); *G06N 3/084* (2013.01)

(58) Field of Classification Search
USPC ........................................................ 706/12
See application file for complete search history.

(56) References Cited

U.S. PATENT DOCUMENTS

| | | | |
|---|---|---|---|
| 8,531,738 B2 * | 9/2013 | Shimomura | G02B 26/125 |
| | | | 358/474 |
| 8,824,648 B2 * | 9/2014 | Zoldi | H04Q 3/0029 |
| | | | 379/114.14 |
| 9,535,959 B2 * | 1/2017 | Sun | G06F 16/24558 |
| 10,102,530 B2 * | 10/2018 | Zoldi | G06Q 20/4016 |
| 10,373,061 B2 * | 8/2019 | Kennel | G06N 7/005 |
| 10,515,084 B2 * | 12/2019 | Sun | G06F 16/24558 |
| 10,579,938 B2 * | 3/2020 | Zoldi | G06K 9/6234 |
| 10,627,229 B2 * | 4/2020 | Jackson | G01C 5/00 |
| 10,692,058 B2 * | 6/2020 | Zoldi | G06Q 20/10 |
| 10,713,711 B2 * | 7/2020 | Zoldi | G06Q 30/0269 |

(Continued)

OTHER PUBLICATIONS

Canini, Kevin R., Lei Shi and Thomas L. Griffiths. (2009) "Online Inference of Topics with Latent Dirichlet Allocation." *Proceedings of the Twelth International Conference on Artificial Intelligence and Statistics*. vol. 5. Apr. 16, 2009 (Apr. 16, 2009), pp. 65-72.

(Continued)

*Primary Examiner* — Michael B Holmes
(74) *Attorney, Agent, or Firm* — Mintz Levin Cohn Ferris Glovsky and Popeo, P.C.

(57) ABSTRACT

A system and method to explain model behavior, which can benefit not only those seeking to meet regulatory requirements when using machine learning models but also help guide users of the model to assess and increase robustness associated with model governance processes. The method described utilizes changes in behavior of a time series to identify the latent factors that drive explanation.

18 Claims, 6 Drawing Sheets

(56) References Cited

U.S. PATENT DOCUMENTS

| | | | |
|---|---|---|---|
| 10,791,136 B2* | 9/2020 | Zoldi | G06Q 10/0635 |
| 10,896,381 B2* | 1/2021 | Zoldi | G06N 20/00 |
| 10,902,124 B2* | 1/2021 | Schmidtler | H04L 63/1416 |
| 2014/0180974 A1 | 6/2014 | Kennel et al. | |
| 2017/0206466 A1 | 7/2017 | Zoldi et al. | |

OTHER PUBLICATIONS

Coleman, Cody A., Daniel T. Seaton and Isaac Chuang. (2015) "Probabilistic Use Cases: Discovering Behavioral Patterns for Predicting Certification." Learning @ Scale, L@S 2015, ACM, 2 Penn Plaza, Suite 701 New York NY 10121-0701 USA, Mar. 14, 2015 (Mar. 14, 2015), pp. 141-148.

\* cited by examiner

EXPLAINING MACHINE LEARNING MODELS BY TRACKED BEHAVIORAL LATENT FEATURES

TECHNICAL FIELD

The subject matter described herein relates to machine learning models, and more particularly to systems and methods for explaining machine learning models by tracked behavioral latent features.

BACKGROUND

Artificial neural networks are a popular machine learning model utilized in a broad range of fields, from medical diagnostics and product recommendation systems to cyber security and financial risk assessment. In recent years, neural network architectures have become increasingly complex, trending towards deeper architectures, with each additional layer bringing a higher degree of abstraction and opacity and making the behavior of the model more difficult to interpret and explain.

In parallel with this trend, there is increased regulatory pressure for data-driven automated systems to increase transparency by providing suitable explanations for decisions based on model scores. Beyond regulation the need for explainability has been a core request associated with machine learning models by clients that act based on these scores. Typically, the set of models are called "black box" models, which implies that it is difficult to get to underlying reasons to interpret what drives the model's score assignment.

These challenges with explanations of the scores associated with "black box" machine learning models are often a major factor limiting the adoption of neural networks and other advanced algorithms that are capable of modelling non-linear aspects of complex datasets, as they do not inherently include a mechanism to produce explanations for their outputs. The opaque nature of the neural network algorithm as it produces scores from its data inputs makes the problem of generating relevant explanations a challenging issue.

Existing methods to provide explanations for neural network outputs are limited in a variety of ways, making them unsuitable for use in high-throughput systems that process low latency complex data observations. A classic method for generating explanations is to iteratively evaluate the effect of removing or perturbing each input variable and monitor the effect on the scoring output. These perturbation-based methods require hundreds to thousands of rescoring iterations for each real production, single scoreable event, making them unsuitable for high-throughput production environments where low latency of the score response is critical. In addition, this type of approach can fail to discover the most relevant explaining factors, as it focuses on input sensitivity in local convoluted areas of phase space. When compared against population-based evidence, these sensitivity methods prove overly sensitive to noise and position in input phase space using local perturbations.

Another existing approach is to divide the neural network inputs into a table of percentile bins and to calculate the expected score for each bin based on large sets of historical data. When scoring, the value of each input can be used to perform a quick lookup of the expected scores given this input value from the previously generated table. Inputs with the expected score closest to the actual score are inferred as the most likely explanations for that score based on a historical data support which smooths out local variations and noise in the data.

This type of approach is fast and efficient, making it suitable for online, high-throughput environments, such as approval of credit card transactions; however, it can fail to provide the most relevant explanations where the neural network output is driven by a joint contribution between multiple inputs (nonlinearities) or when the statistical properties of the input variables vary widely making binning more complex which can be the case when the customers/accounts are of different distinct classes/segments. Indeed, one of the main advantages of neural network models is their ability to discover and leverage complex relationships from many types of inputs. When successful, it is precisely these latent features that drive improved detection. In these cases, explanations tend to be dominated by the latent factors versus single variables in isolation, but still customer behavioral segments are important in terms of interpretation of reasons.

For applications that use a neural network predictor to detect anomalous events in a time series, such as fraudulent activity on a credit card or intrusion attempts within a computer network, the scores are often best understood as the presence or absence of deviation from past behavior. In these cases, explanations derived from comparisons to the general population or against random perturbations often do not adequately reflect the change in behavior that the model has detected.

SUMMARY

This document describes a system and method to explain model behavior, that can benefit not only those seeking to meet regulatory requirements when using machine learning models but also help guide users of the model to assess and increase robustness associated with model governance processes. The method described herein utilizes changes in behavior of a time series to identify the latent factors that drive explanation.

This invention provides a system and method for providing rapid and robust explanations for scores or classifications determined by a neural network upon a profiled series of observations. The invention addresses the limitations of existing methods by deriving latent features from neural network inputs and hidden layers to construct behavioral archetypes and compare them against their profiled averages to determine the factor or combination of factors that explain a change in score or classification result.

A latent topic modelling technique such as Latent Dirichlet Allocation is used on historical data to learn a number of behavioral archetypes that embody typical patterns of the profiled entity based on the observable events. For classification systems, these archetypes may align well with certain behavioral characteristics of entities allowing for soft segmentation of customers into archetypes. For example, a system to explain fraud can be trained on data collected from known fraud and non-fraud observations to learn a number of patterns and scenarios most typical to fraud which will provide human understandable explanations for what drives model response to changing data patterns for a consumer.

During scoring, archetype weights are computed by using a predetermined word mapping procedure and latent topic model to estimate the probability of each archetype given the observation and history of observations for an entity. These calculated archetype weights are individually compared against a long-term average value for the archetype across the entire time series for the entity. These long-term archetype averages are initialized at the population average that was determined during preprocessing and updated with the weights computed at each observed event in the time series for the entity. Archetypes that exhibit an increase in weighting compared to the profiled average are considered as potential explanations for a corresponding change in score compared to the average.

This comparison of archetype weights against their individual time series profiled average is sufficient to identify the types of behavior that can be observed in a change event. However, not all types of behavior are equally risky, and additional steps are required to determine which of these factors best explains the scoring output of the neural network. In many cases, a change event will result in a mixture of archetypes that shows increased contribution across multiple latent factors, and it is necessary to have a procedure to rank order the archetypes and their corresponding explanations in the context of the score.

To determine the most significant factors that drive the score produced by the neural network, the archetype weights for both the current observation and the long-term profile average are used to look up expected scores using the precomputed lookup table of topic percentile bins. The current observation archetypes that result in the highest increase in expected score compared to the time series profiled archetype average archetypes are considered to be the most significant factors that drive the neural network output. Further, the algorithm can be secondarily refined using the current transaction score and archetype values to look up the historical score support for closeness of the current transaction archetype score averages to hone the reasons further based on the current score. The most significant archetypes determined in this manner can be interpreted as an explanation by using the most representative behaviors contributing to the topic allocation from the latent topic model, as determined by conditional behavioral probability, to assign reasons/explanations and optionally assigning a categorical reason code according to these words for operationalizing in a decision system.

The new method described above is designed to address the shortcomings of existing alternative approaches described in the previous section and provides multiple advantages over them. By using latent topic modelling, the current approach is able to capture deeper statistical properties of the neural network inputs, combining multiple factors into a smaller number of behavioral archetypes that capture latent factors of behavior, leading to explanations that more accurately reflect the relationships driving the score based on historical data. In addition, this method leverages previous data points within a given time series to provide a locally relevant context for comparison of the individual's behavior patterns, rather than relying on statistics from the global population or randomly generated perturbations. The method is independent of the neural network architecture, and can handle both a large number and a large variety of input variables. Finally, this method is fast and efficient, with no requirement to perform time consuming rescoring calculations or store a large amount of profiled data.

In some aspects, a computer-implemented method, system and computer program product are presented, which execute a process including the steps of receiving a time series of input variables representing a time-ordered sequence of observations associated with an entity. The process further includes generating a word dictionary for the input variables, the word dictionary representing a unique sequence of event words across the entity and a group of other entities, and generating a set of archetypes from the unique sequence of event words, where topic modeling associates a loading of archetypes associated with each event word. The process further includes generating, with a topic modeling module, a vector of weights representing a distribution of the time series of input variables aligning with each of a given number of latent topic variables, the given number of topic variables corresponding to latent features of behavior based on variable values. The process further includes producing, according to a machine learning model, a detection score associated with the entity for each input event in the time-ordered sequence of observations.

In yet other aspects, the process further includes generating, by the one or more computer processors, one or more explanations, each explanation describing a reason corresponding to the produced detection score. Such process can further include filtering, through comparison against profiled average values of latent topic variables by the one or more computer processors, the one or more explanations to generate a filtered list of explanations according to archetype, the filtered list providing a list of archetypes associated with the detection score and increasing in relevance of behavior. The process can further include ranking, according to a closeness of a bin of historical latent topic variables' expected score to the current score on the event, the filtered list of archetypes and associated reasons that most affect the detection score.

Implementations of the current subject matter can include, but are not limited to, systems and methods consistent including one or more features are described as well as articles that comprise a tangibly embodied machine-readable medium operable to cause one or more machines (e.g., computers, etc.) to result in operations described herein. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to an enterprise resource software system or other business software solution or architecture, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

The current subject matter is directed to methods, systems, apparatus/articles, and computer program products for detecting behavioral anomalies and behavioral change-points within a series of observed events. Machine learning models can be augmented to generate an explanation based on changes in behavioral archetypes in addition to the original output of a detection score. Examples applications include, but are not limited to, automated detection of events such as credit card fraud, identity theft, and intrusion of a computer network or physical premises, as well as the discovery of changes in customer preferences or market conditions.

Figure 1:
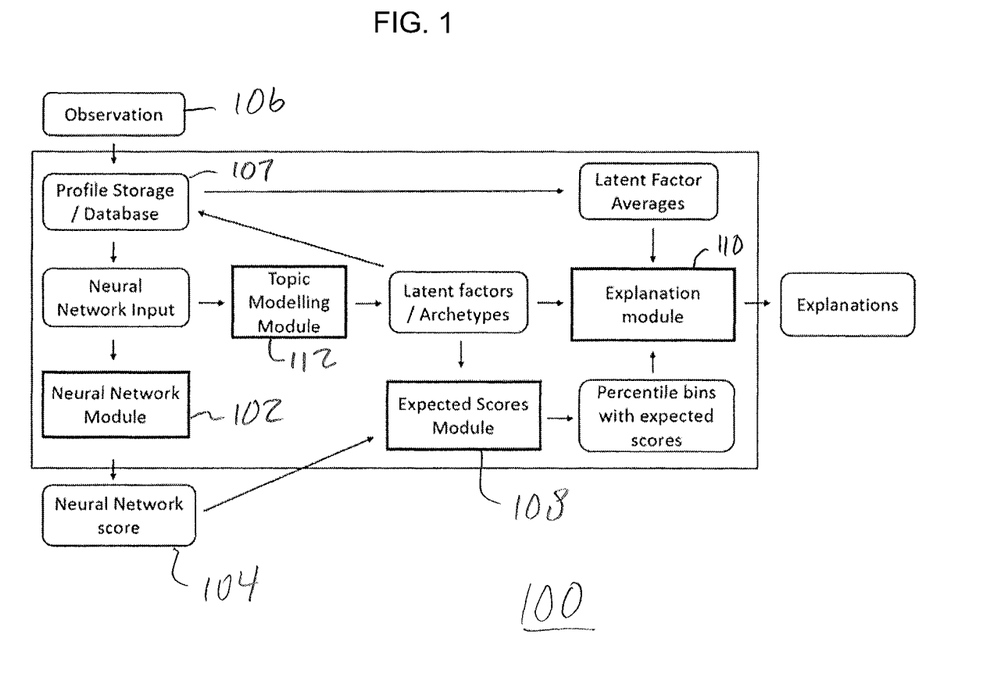
FIG. 1 is a flow diagram illustrating a system designed to detect significant change events of interest, using a neural network predictor to produce detection scores reflecting the probability of such an event having occurred, and also producing one or more explanations for each neural network output.

FIG. 1 is a flow diagram illustrating a system 100 designed to detect significant change events of interest, using a neural network predictor to produce detection scores reflecting the probability of such an event having occurred. The system 100 includes a neural network module 102 for generating one or more neural network scores 104. The system 100 is given a series of input events as a time-ordered sequence of observations 106, and a scores module 108 produces a detection score for each point in the time series. The observations 106 can be stored in a profile storage or database 107. In addition to the score output, an explanation module 110 is provided and configured for generating one or more explanations that describe the explanation reasons corresponding to the produced score.

While the process of generating scores from inputs is defined as a neural network module, the properties and internal implementation of the module may vary widely, as the method for generating explanations is suitable for any type of network architecture regardless of depth, width or activation function, requiring only that it provides a scoring output. The methods described herein are also suitable for any variety of input variables, which may be continuous, Boolean, or discrete, and do not assume that the inputs follow any type of probability distribution nor that the individual input variables are identically or similarly distributed. Scoring is typically performed through application of a feedforward algorithm, using weights that are typically derived using some variant of a backpropagation algorithm, as described in further detail below.

In parallel to neural network processing, the system 100 uses a topic modelling module 112 to generate a vector of weights representing the probability of input variables aligning with each of a given number of latent factors or topics associated with the transaction history of the entity. The number of topic variables used in the model is predetermined by the system's designer and is application dependent—a greater variety of behavioral patterns present in the input should correspond to a larger number of topics, but is typically significantly smaller than the number of inputs. Thus, each latent topic can be interpreted as representing a behavioral archetype present in the dataset, and the corresponding weight values for each topic represent the relative contribution of each archetype as they are used to describe the observed events associated with a customer's historical data and associated variable values.

The transformation of observed inputs from an individual into a space of latent factors which are learned collectively from a population of similar individuals is a common technique for prediction of future behavior, sometimes termed as collaborative filtering. In this setting, collaborative filtering is applied to a profile of observed events for an individual entity to: 1) condense a cardinality and complexity of raw input space into a smaller number of well-defined archetypes that encompass collective behaviors most typically seen in the data; and 2) to quantify a deviation of the currently observed behavior archetypes from the expectation based on the long term history of the profiled entity in terms of the learned archetypes of the near-term history of the customer.

The most important properties of the collaborative filtering technique used in this method are robustness and the ability to translate transaction behaviors into latent factors that are easily understandable. Considering these desired properties, Latent Dirichlet Allocation (LDA) is the preferred implementation of latent factor modelling, due to its usage of words and topics as a basis for explainable factors, and the tendency for the learned topics to be well-behaved, following a predictable distribution and being robust to noise present in the input.

LDA is a Bayesian probabilistic method which simultaneously estimates probability distributions over archetypes (topics) for each of the profiled entities, and a probability distribution of discrete demographic, non-monetary, and monetary financial data and derived transaction profile variable value (words) for each topic. The latter, in the form of a matrix for an LDA model, represents collective behaviors relating to observed event data and profile variables to discovered archetypes. The number of archetypes is usually substantially lower than the cardinality of the word space so it can be considered a dimensionality reduction method. These archetypes have been shown to be highly interpretable, often the archetypes themselves can be assigned physical interpretable meanings. When using the LDA model in scoring mode, the archetype loadings can be updated in real-time. An algorithm to accomplish this is described in U.S. patent application Ser. No. 14/566,545, entitled "Collaborative Profile-Based Detection Of Behavioral Anomalies And Change-Points," incorporated by reference herein for all purposes, and which supports the use of the analytic techniques to allow recursive real-time collaborative profiling to determine archetypes based on streaming data.

As a topic modelling technique originally developed, but not restricted to document classification, LDA requires inputs in the form of discrete words, which can be equated to observed categorical data or derived from binning of continuous inputs. To accommodate this, a procedure to map the neural network inputs into a vocabulary of words to be used by the topic model is defined in the topic modelling module 112 as a simple lookup table that assigns the corresponding word given the input index and value. The nature of this mapping can be according to how the input variable is distributed—for example, an input that takes Boolean values of 1 and 0 may be represented by the presence or absence of a single word representing that variable, while a numerical input that represents a continuous risk factor could be split into multiple percentile bins, with each bin representing an approximate degree of risk (e.g. low, high, very high). These types of word representations are applied uniquely and consistently to a population of training examples that contain a representative sampling of behaviors that are to be explained by the system or method.

Figure 2:
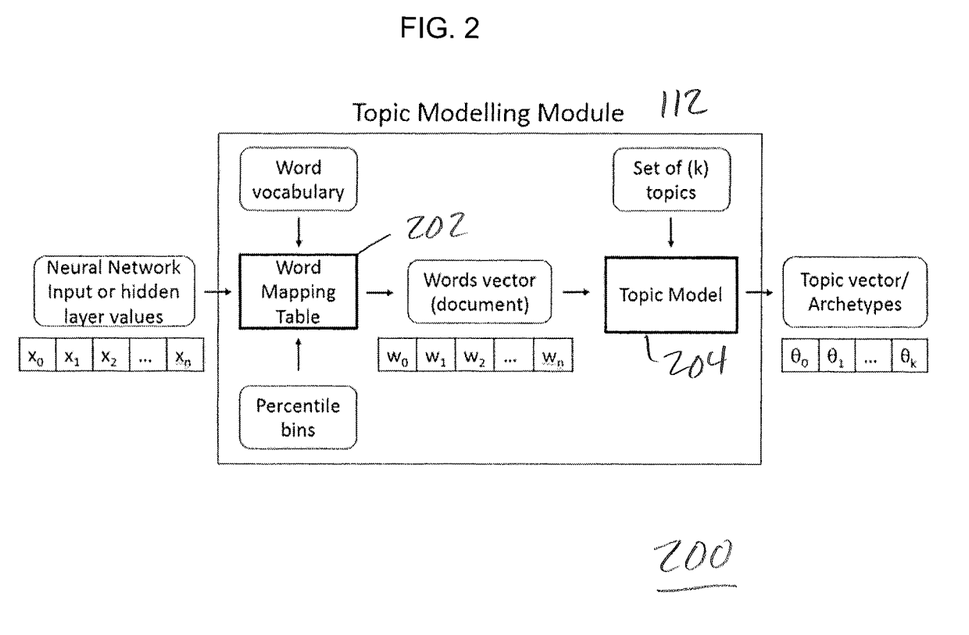
FIG. 2 illustrates the process of mapping the vector of neural network inputs into a word vector through the use of a pre-defined vocabulary and the subsequent process of deriving a vector of latent archetype weights from this word vector.

FIG. 2 illustrates the topic modelling module 112 and a process 200 of mapping the vector of neural network inputs into a word vector through the use of a pre-defined vocabulary and binning in a word mapping table 202. The number and boundaries for the binning of continuous variables may be determined by the system designer, but it may be useful to choose a small number of bins based on percentile values and representative of observable behavioral characteristics that may be relevant to scoring. For example, a variable that represents a certain observed rate may be mapped to "LOW_RATE," "MEDIUM_RATE," and "HIGH_RATE," based on percentile value, or a variable that tracks anomalous high amounts may use a mapping based on the upper range of outliers, with words such as "HIGH_AMOUNT," "VERY_HIGH_AMOUNT", and "EXTREMELY_HIGH_AMOUNT". The construction of this word dictionary mapping enables a scientist to define relative sensitivities in features, and can be applied to values of hidden layers as well.

The topic modelling module 112 includes a topic model 204. The parameters for the topic model 204 are "learned" in a preprocessing stage and may be done concurrently with the training of the neural network scoring model. For LDA-based models, the training algorithm used may be implemented as a variational Bayes approximation of the posterior distribution, or alternatively may use a Gibbs sampling approach. The training is performed on a set of historical data observations such as those used to train the neural network, mapped into the appropriate vocabulary of words using the procedure described above.

Subsequently in the preprocessing stage, a lookup table to estimate an expected score based on topic allocation is compiled by evaluating the topic allocation and score outputs of the neural network modules, and collecting the statistics on a holdout dataset of historical observations that is a representative subpopulation of the complete dataset. The result of this evaluation is a dataset that embodies a collection of typical behavioral scenarios, with each scenario being represented by a vector of archetype values and also a corresponding score. For each latent topic or behavioral archetype, a set of percentile bins is created, as an example spaced at equal intervals. For example, 20 bins may be used for each archetype in the lookup table, each spanning a 5 percentile range. Based on this percentile binning, the holdout dataset can be divided into an even number of observations for each archetype, and then an expected score for reach bin can be determined as the average or mean of neural network scores corresponding to those observations in the historical data used to develop the model.

Figure 3:
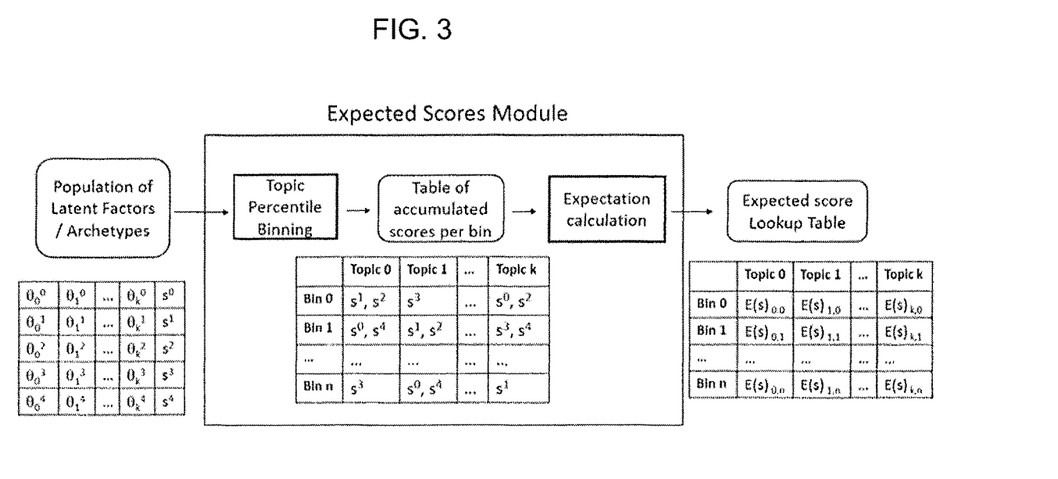
FIG. 3 illustrates a process of accumulating a collection of scores according to the archetype binning, by a topic percentile binning module, of corresponding archetype weights in the expected scores module.

FIG. 3 illustrates a process 300 of accumulating a collection of scores according to the binning, by a topic percentile binning module 302, of corresponding archetype weights in the expected scores module. This preprocessing step produces a single lookup table of K×N bins, where K is the number of topics selected and N is the number of percentile bins per topic, which can be used for quick evaluation of the expected score per topic. Using the previous example of 20 bins and 10 topics would correspond to a lookup table with 200 expected scores that are evaluated and stored. During preprocessing, each historical observation is transformed into a vector of k=10 topic allocations, each independently falling into one of 20 percentile bins. The neural network score corresponding to that observation is accumulated in the appropriate bin determined for each topic, and after evaluation on the entire dataset, an expected score can be determined by an expectation calculation module 304 as an average value of the scores accumulated in each bin for the historical data.

The final step in the preprocessing stage is assignment of a behavior-based description or one or more reason codes for each archetype. These explanatory values may be imputed from a mixture of the most significant words that comprise each archetype, in accordance with the trained topic model, and they may target an existing set of reason codes that have been predefined for the application. This mapping of behavioral archetypes to explanations is stored along with the percentile bin-based lookup table for expected scores.

In some cases, the behavioral archetype learned by the topic model may contain words that correspond to multiple predefined codes, or may encompass a number of more elemental behavioral patterns. In this case, the probability of each word estimated by the topic model can be accumulated for each reason code or behavior to produce a relative weight for each explanatory component within the topic. This ordering can be used to determine a primary reason along with secondary reasons that are assigned to the archetype.

During scoring, the neural network inputs and outputs are generated as normal, typically using the feedforward algorithm on profiled input variables. In addition to scoring, the neural network inputs and corresponding hidden node outputs may be transformed into a set of discrete words and subsequently into a vector of archetype weights using the processes defined above in the topic modelling module.

In order to determine whether the archetype weights are consistent with previous observations, and if not, which types of behavior are responsible for the change, this evaluation requires that the system maintains a profiled state of expected behavior in the archetype space based off of the individual's history of observations. The expected behaviors stored in the profile can be evaluated as the exponentially decayed moving average of each archetype weight, which may be decayed over the number of observed events or the time elapsed between the events.

These archetype average estimates are computed through sequential updates of the existing archetype loadings according to the weights that are computed from each newly observed observation in the time series. At the first event, the initial estimate is set to the global prior distribution of archetype weights, determined and stored as the average value of each archetype across the entire training set. With each new observation, the existing estimate is decayed according to some user-defined decay factor, designed to capture long-term patterns in behavior while also accounting for seasonal shifts that may occur over time. For example, a user may choose a decay constant of EXP(−1/30), resulting in the following formula to update the average archetype estimates:

$$\bar{\theta}_t^k = \bar{\theta}_{t-1}^k e^{-\frac{1}{30}} + \theta^k \left(1 - e^{-\frac{1}{30}}\right),$$

Where $\bar{\theta}_t^k$ corresponds to the newly updated average archetype estimate for topic index k, $\bar{\theta}_{t-1}^k$ is the value of the existing average archetype distribution estimate before the update, stored from the previous time step (t−1), and $\theta^k$ is the archetype weight distribution evaluated for the current observation for topic index k.

Figure 4:
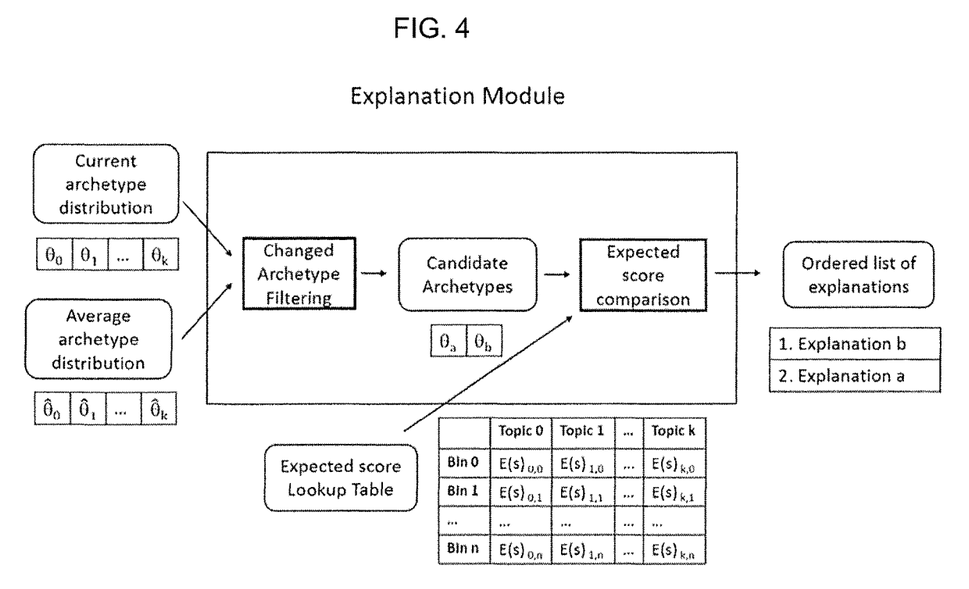
FIG. 4 illustrates a process of determining change archetypes for candidates of explanation from the current archetype loadings and that of historical archetype loadings of the entity, and the retrieving an estimated score to compare with actual score to produce an ordered list of explanations by an explanation module.

Referring now to FIG. 4, the archetype weights for the current observation and their expected values according to the profiled average estimates, are used to determine which archetypes are most relevant to explain an observed change in neural network output. Given these inputs, the explanation module 110 can perform the first step of filtering, using a changed archetype filtering module 402, which evaluates archetypes for relevant change points based on the change in value relative to the historical average. Only behaviors with a corresponding increase in archetype weight are considered as candidate explanations, as an archetype with no deviation from the profiled history does not explain any underlying change event, and a significant decrease in archetype weight is likely due to increased contributions from other archetypes.

The implication of this type of filtering is that some types of behaviors may be moderately indicative of a changed state that the system is designed to detect, according to global statistics of the entire population. However, these same behaviors may be very typical for a given profiled entity and align well with normal behavior, making them a poor explanation for a change event. For example, a credit card user may use a particular card exclusively when travelling overseas, so an explanation for a sudden increase in fraud detection score may not intuitively include the existence of foreign transactions as a driving factor, even though in isolation it may be a significant risk factor accounted for in the neural network when not accounting of the individual's behavior.

Figure 5:
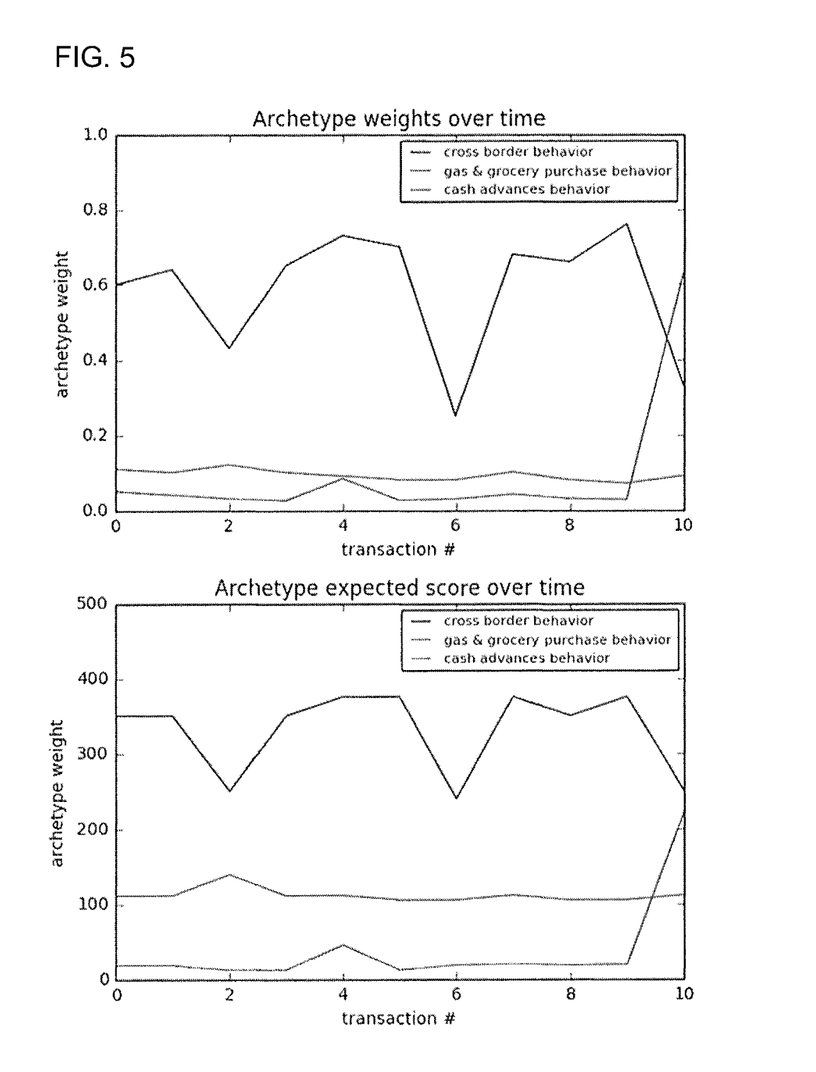
FIG. 5, which depicts a hypothetical series of credit card transactions made by the user from the above given example of a frequent overseas transactor.

This type of effect is illustrated in FIG. 5, which depicts a hypothetical series of credit card transactions made by the user from the above given example of a frequent overseas transactor. The top plot shows the allocation of weights estimated by the topic model for a number of transactions for three behavioral archetypes for a credit card fraud detection application. Although each transaction results in a different distribution of archetype weights, this user clearly aligns with the "cross border behavior" archetype more prominently than the other two that are shown. The bottom plot shows the same series of transactions displayed in terms of the expected scores that have been evaluated given the archetype weight values shown in the corresponding plot. The final transaction (#10) depicts a change event that may be indicative of fraudulent activity. In this case, although the allocation for the "cross border behavior" archetype evaluates to a higher expected score, the change in "gas & grocery purchase behavior" produces a better explanation for the change event.

After the archetypes have been filtered by the archetype filtering module 402 to include only those that have increased contribution relative to the expected profile average, the remaining archetypes are further evaluated by an expected score comparison module 404 to determine which changes are most likely to result in a change in score. This is done by looking up the expected score according to the precomputed percentile bins for both the current and averaged history archetype for each candidate archetype and calculating the difference between them. The archetypes with the largest positive difference in expected scores represent the behaviors that are most likely to explain a positive change in score.

To generate the final explanation outputs, the archetypes are rank ordered by the expected score differences and the predetermined behavior description or reason code is assigned by lookup table for the highest ranked archetype. The next highest ranking archetypes may optionally be used to provide secondary explanations for the scoring output. In a secondary refinement, the expected score for the ranked candidate explanation archetypes are compared to the current neural network transaction score where closeness of the score provides evidence support to further refine ranking. Strong explanations are then a combination of distance moved in archetype loadings and score values of the archetype expected scores of the current short-term archetype value vs current neural network score, and where the current short-term archetype expected score is closest to the current transaction score.

Figure 6A:
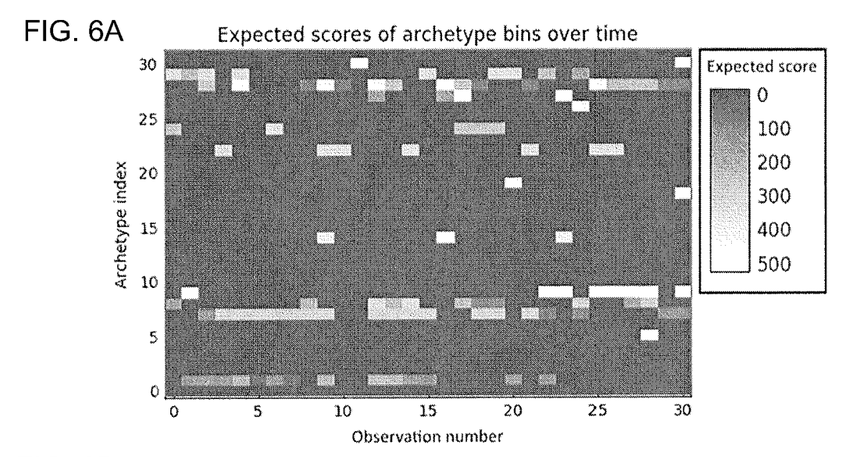
FIGS. 6A-6C are a set of diagrams that illustrates the archetype weights evaluated for each observation in a test series of credit card transactions.
Figure 6B:
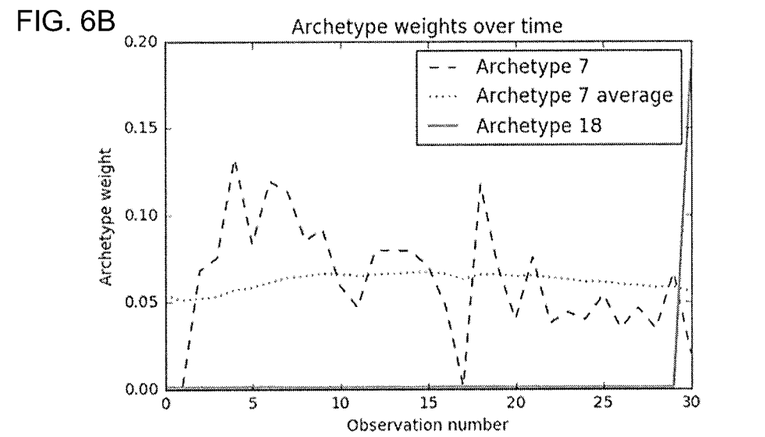
Figure 6C:
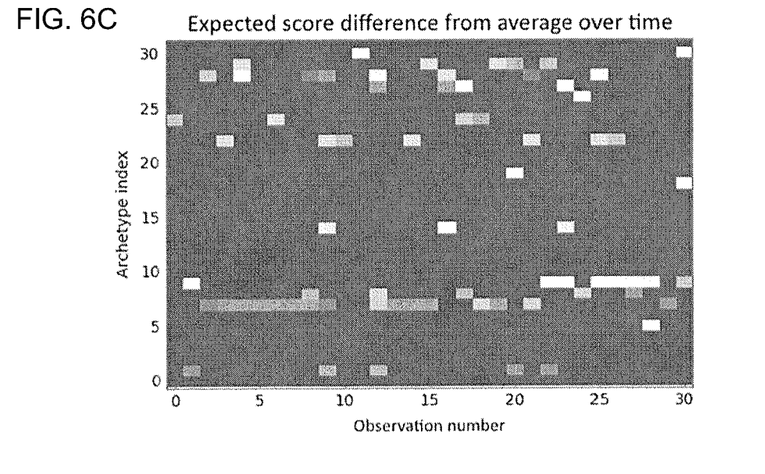

The following example, as illustrated in FIGS. 6A-6C, uses the subject method on a dataset containing credit card transactions, some of which have been labelled as fraudulent. The implemented system represents a hypothetical application to detect and report cases of credit card fraud, with each card number corresponding to an account that represents the profiled entity, each containing multiple transactions representing a series of observed events.

In this example application, a neural network model has been trained on a credit card fraud dataset using 230 input variables derived from the historical data and fraud and non-fraud tags, with fraudulent transactions having a target value of 1 and non-fraud transactions having a value of 0. This represents an online fraud detection system that takes a stream of transactional inputs and returns a fraud score for each observation, with high scores corresponding to a high probability of fraud present.

This fraud detection application is augmented with a topic modelling module that transforms the 230 neural network inputs into a set of 32 behavioral archetypes using LDA as the modelling technique. The LDA and neural network models were subsequently used to compute scores and topic allocations on a holdout set of credit card accounts, with the average score being assigned to each of 640 percentile bins in a 32 topic×20 bin matrix. The binning of each topic distribution was designed to divide the dataset into 20 equally populated segments at 5 percentile intervals.

The words used as input to the LDA topic model were derived from the neural network inputs (in this representation, hidden node values are not included), which characterize a large variety of transactional behavior relevant to fraud. These include, but are not limited to Boolean features such as exemplary values such as binary ones "is_cross_border", and continuous values such as "average_dollar_amount", and more abstract values such as "merchant class risk average". Variables with continuous values were binned by percentile, with a focus on delineating value ranges that are most relevant to detection of fraud.

For example, "merchant class risk average" was discretized into the words "MCC_RISK_HIGH" for values between 68th-95th percentile, "MCC_RISK_VHIGH" for values between 95th-99th percentile, and "MCC_RISK_XHIGH" for values greater than 99th percentile as a way of characterizing varying degrees of this risk factor in terms of statistical outliers of the underlying distribution and discounting values corresponding to a normal or low amount of risk as a common characteristic irrelevant to the determination of archetypes based on fraud behavior. This discounting of common words can be considered similar to the elimination of stop words in modelling of natural language.

FIGS. 6A-6C are a set of diagrams that illustrates the archetype weights evaluated for each observation in a test series of credit card transactions, with a fraud event occurring at the final observation, resulting in both a large increase in score and a shift in archetype distribution. Clearly visible in plot 6A are relatively high bands of expected scores present both as horizontal lines and individual peaks. The horizontal bands at archetypes 1, 7, and 28 represent prevailing archetypes of behavior for the profiled account, which represent normal behavior that has some element of fraud risk, while the individual peaks that occur at various points across the transaction history represent moderately suspicious or risky behaviors that are not labelled as fraud.

At the final observation (number 30), there are multiple strong peaks that can be seen according to the archetype values determined for indices 7, 9, 18, 28, and 30; however, by factoring in the expected weights from the profiled averages, the contributions from topics that exhibited a historical pattern of high contribution can be eliminated, leaving only topics 9, 18, and 30. This process of discounting behaviors that show a decreased representation after the change is more clearly illustrated in plot 6B, where the weight values for two archetypes are shown across the sequence of transactions. For archetype 7, the value for the fraudulent transaction is less than the moving average evaluated for that archetype, and thusly it can be discarded as a relevant explanation for the change in score. In contrast, archetype 18 has no history of any significant weight prior to the final observation, making the associated behaviors a strong candidate for explaining the corresponding change in score.

After this process, the three remaining topics are ordered by difference in expected score to generate the final set of explanations. The effects of filtering and evaluating the difference from average can be seen in the plot of FIG. 6C, which shows a decrease in horizontal banding compared to that of FIG. 6A. For this given example of credit card transactions, the application of this process leaves three candidate behavioral archetypes to explain the increased score at the fraudulent transaction: the primary explanation corresponds to archetype index 18, which has a behavior description of "High merchant risk," the secondary explanation corresponds to archetype index 30, with the description of "Unusual amounts for merchant class," and the tertiary explanation of "Unusual geographic activity" describing archetype 9.

Alternatively, instead of using the distance of each archetype from its historical average as a strict filter, they could be used to calculate a measure of relative significance by normalizing by their standard deviation. This change significance factor could then be divided by the difference in expected score from observed score to produce a rank ordered list of archetype-based explanations. In this example, both approaches result in a primary, secondary, and tertiary explanation corresponding to topics 18, 30, and 9, respectively.

The primary explanation generated by the subject matter is "High merchant risk," which is clearly an important change in observed behavioral patterns for the customer in the given example. While there are other behaviors present that are also risk factors for fraud, this user has a history of consistently making purchases from reputable merchants, and therefore, the sudden change in merchant behavior makes sense as the primary explanation for the detected fraud.

The systems, methods, and apparatuses detailed above incorporate a new technique for providing explanations for scores determined by a machine learning model that isolates latent behavioral features as the basis of an efficient and robust procedure. Using the prior observations in a series of events, this method is able to provide explanations that are more relevant than existing methods that compare against randomly generated perturbations or statistical properties of the general population. These properties make the approach well suited for complex and high-throughput applications that use a neural network to detect behavioral changes in real time.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT), a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method comprising:
   receiving, by one or more computer processors, a time series of input variables representing a time-ordered sequence of Observations associated with an entity;
   generating, by the one or more computer processors, a word dictionary for the input variables, the word dictionary representing a unique sequence of event words across the entity and a group of other entities;
   generating, by the one or more computer processors, a set of archetypes from the unique sequence of event words, where topic modeling associates a loading of archetypes associated with each event word;
   generating, with a topic modeling module executed by the one or more computer processors, a vector of weights representing a distribution of the time series of input variables aligning with each of a given number of latent topic variables, the given number of topic variables corresponding to latent features of behavior based on variable values;
   producing, according to a machine learning model executed by the one or more computer processors, a detection score associated with the entity for each input event in the time-ordered sequence of observations;
   generating, by the one or more computer processors, one or more explanations, each explanation describing a reason corresponding to the produced detection score;
   filtering, through comparison against profiled average values of latent topic variables by the one or more computer processors, the one or more explanations to generate a filtered list of explanations according to archetype, the filtered list providing a list of archetypes associated with the detection score and increasing in relevance of behavior; and
   ranking, according to a closeness of a bin of historical latent topic variables' expected score to the current score on the event, the filtered list of archetypes and associated reasons that most affect the detection score.

2. The method in accordance with claim 1, the machine learning model includes a neural network.

3. The method in accordance with claim 1, wherein the ranking of the filtered list of archetypes that most affect the detection score according to a closeness of a bin of historical latent topic variables' expected score to the current score on the event is evaluated by one or more computer processors and a precomputed lookup table.

4. The method in accordance with claim 3, further comprising:
   compiling, by the one or more computer processors, the lookup table to estimate an expected score based on topic allocation by evaluating the topic allocation and score outputs of the machine learning model.

5. The method in accordance with claim 4, further comprising:
   collecting, by the one or more computer processors, statistics on a holdout dataset of historical observations that is a representative subpopulation of a complete dataset of the time series of input variables.

6. The method in accordance with claim 5, wherein the representative subpopulation of the complete dataset includes a dataset of typical behavioral scenarios, with each typical behavioral scenario being represented by a vector of archetype values and a corresponding score.

7. A computer program product comprising a non-transitory machine-readable medium storing instructions that, when executed by at least one programmable processor, cause the at least one programmable processor to perform operations comprising:
   receive a time series of input variables representing a time-ordered sequence of observations associated with an entity;
   generate a word dictionary for the input variables, the word dictionary representing a unique sequence of event words across the entity and a group of other entities;
   generate a set of archetypes from the unique sequence of event words, where topic modeling associates a loading of archetypes associated with each event word;
   generate, with a topic modeling module, a vector of weights representing a distribution of the time series of input variables aligning with each of a given number of latent topic variables, the given number of topic variables corresponding to latent features of behavior based on variable values;
   produce, according to a machine learning model, a detection score associated with the entity for each input event in the time-ordered sequence of observations;
   generate one or more explanations, each explanation describing a reason corresponding to the produced detection score;

filter, through comparison against profiled average values of latent topic variables, the one or more explanations to generate a filtered list of explanations according to archetype, the filtered list providing a list of archetypes associated with the detection score and increasing in relevance of behavior; and rank, according to a closeness of a bin of historical latent topic variables' expected score to the current score on the event, the filtered list of archetypes and associated reasons that most affect the detection score.

8. The computer program product in accordance with claim 7, wherein the machine learning model includes a neural network.

9. The computer program product in accordance with claim 7, wherein the ranking of the filtered list of archetypes that most affect the detection score according to a closeness of a bin of historical latent topic variables' expected score to the current score on the event is evaluated by one or more computer processors and a precomputed lookup table.

10. The computer program product in accordance with claim 9, further comprising:
compiling, by the one or more computer processors, the lookup table to estimate an expected score based on topic allocation by evaluating the topic allocation and score outputs of the machine learning model.

11. The computer program product in accordance with claim 10, further comprising:
collecting, by the one or more computer processors, statistics on a holdout dataset of historical observations that is a representative subpopulation of a complete dataset of the time series of input variables.

12. The computer program product in accordance with claim 11, wherein the representative subpopulation of the complete dataset includes a dataset of typical behavioral scenarios, with each typical behavioral scenario being represented by a vector of archetype values and a corresponding score.

13. A system comprising:
a programmable processor; and
a non-transitory, machine-readable medium storing instructions that, when executed by the programmable processor, cause the at least one programmable processor to perform operations comprising:
receive a time series of input variables representing a time-ordered sequence of observations associated with an entity;
generate a word dictionary for the input variables, the word dictionary representing a unique sequence of event words across the entity and a group of other entities;
generate a set of archetypes from the unique sequence of event words, where topic modeling associates a loading of archetypes associated with each event word;

generate, with a topic modeling module, a vector of weights representing a distribution of the time series of input variables aligning with each of a given number of latent topic variables, the given number of topic variables corresponding to latent features of behavior based on variable values;

produce, according to a machine learning model, a detection score associated with the entity for each input event in the time-ordered sequence of observations;

generate one or more explanations, each explanation describing a reason corresponding to the produced detection score;

filter, through comparison against profiled average values of latent topic variables, the one or more explanations to generate a filtered list of explanations according to archetype, the filtered list providing a list of archetypes associated with the detection score and increasing in relevance of behavior; and rank, according to a closeness of a bin of historical latent topic variables' expected score to the current score on the event, the filtered list of archetypes and associated reasons that most affect the detection score.

14. The system in accordance with claim 13, wherein the machine learning model. includes a neural network.

15. The system in accordance with claim 13, wherein the ranking of the filtered list of archetypes that most affect the detection score according to a closeness of a bin of historical latent topic variables' expected score to the current score on the event is evaluated by one or more computer processors and a precomputed lookup table.

16. The system in accordance with claim 15, further comprising:
compiling, by the one or more computer processors, the lookup table to estimate an expected score based on topic allocation by evaluating the topic allocation and score outputs of the machine learning model.

17. The system in accordance with claim 16, further comprising:
collecting, by the one or more computer processors, statistics on a holdout dataset of historical observations that is a representative subpopulation of a complete dataset of the time series of input variables.

18. The system in accordance with claim 17, wherein the representative subpopulation of the complete dataset includes a dataset of typical behavioral scenarios, with each typical behavioral scenario being represented by a vector of archetype values and a corresponding score.

* * * * *